US005538575A

United States Patent [19]

Hinton

[11] Patent Number: 5,538,575

[45] Date of Patent: Jul. 23, 1996

[54] LABELLING MACHINE AND METHOD FOR APPLYING ADHESIVE TO LABELS FOR ATTACHMENT TO CONTAINERS AND ARTICLE THEREFORE

[75] Inventor: Gaylen R. Hinton, Merced, Calif.

[73] Assignee: CMS Gilbreth Packaging Systems, Trevose, Pa.

[21] Appl. No.: 327,267

[22] Filed: Oct. 21, 1994

[51] Int. Cl.$^6$ .......... B32B 31/00

[52] U.S. Cl. .......... 156/215; 156/448; 156/566; 156/568; 156/578; 118/259; 271/276

[58] Field of Search .......... 156/566, 567, 156/568, 571, 575, 576, 578, 448, 458, DIG. 11, DIG. 13, DIG. 31; 118/258, 259, 261; 271/276

[56] References Cited

U.S. PATENT DOCUMENTS

| | | | |
|---|---|---|---|
| 2,703,660 | 3/1955 | Von Hofe et al. . | |
| 2,868,160 | 1/1959 | Paulsen | 118/259 |
| 3,235,433 | 2/1966 | Cvacho et al. | 156/229 |
| 3,294,060 | 12/1966 | McIntyre et al. | 118/261 |
| 3,511,693 | 5/1970 | Davidson | 118/259 X |
| 3,565,724 | 2/1971 | Yamaguchui et al. . | |
| 3,577,293 | 5/1971 | Ritterhoff . | |
| 3,604,584 | 9/1971 | Shank, Jr. . | |
| 3,659,394 | 5/1972 | Hartleib et al. . | |
| 3,663,012 | 5/1972 | Honert | 271/276 |
| 3,765,991 | 10/1973 | Hoffmann . | |
| 3,834,963 | 9/1974 | Hoffman . | |
| 3,878,960 | 4/1975 | Jonsson et al. . | |
| 3,957,570 | 5/1976 | Helm | 156/519 |
| 4,108,709 | 8/1978 | Hoffmann . | |
| 4,108,710 | 8/1978 | Hoffmann . | |
| 4,108,711 | 8/1978 | Hoffmann . | |
| 4,124,433 | 11/1978 | Herdzina et al. . | |
| 4,145,040 | 3/1979 | Huber | 271/276 |
| 4,207,832 | 6/1980 | Bowman et al. . | |
| 4,208,236 | 6/1980 | Santefort . | |
| 4,216,044 | 8/1980 | Herdzina et al. . | |
| 4,242,167 | 12/1980 | Hoffmann . | |
| 4,323,416 | 4/1982 | Malthouse et al. . | |
| 4,336,095 | 6/1982 | Hoffmann . | |
| 4,347,095 | 8/1982 | Yamashita . | |
| 4,366,016 | 12/1982 | Golden, Jr. . | |
| 4,406,721 | 9/1983 | Hoffmann . | |
| 4,416,714 | 11/1983 | Hoffmann . | |
| 4,425,866 | 1/1984 | Hoffmann . | |
| 4,443,285 | 4/1984 | Roth et al. . | |
| 4,447,280 | 5/1984 | Malthouse . | |
| 4,496,409 | 1/1985 | Kontz . | |
| 5,252,155 | 10/1993 | Nowicki et al. | 156/84 |
| 4,500,386 | 2/1985 | Hoffman . | |
| 4,519,868 | 5/1985 | Hoffmann . | |
| 4,526,645 | 7/1985 | Malthouse et al. . | |
| 4,544,431 | 10/1985 | King . | |
| 4,545,832 | 10/1985 | Hoffmann . | |
| 4,552,608 | 11/1985 | Hoffmann et al. . | |
| 4,561,928 | 12/1985 | Malthouse . | |

(List continued on next page.)

FOREIGN PATENT DOCUMENTS

| | | |
|---|---|---|
| 1012906 | 6/1977 | Canada . |
| 0144198A3 | 6/1985 | European Pat. Off. . |
| 0219267A2 | 4/1987 | European Pat. Off. . |
| 2427987 | 6/1978 | France . |
| 1106653 | 3/1968 | United Kingdom . |
| 2029280A | 3/1980 | United Kingdom . |

*Primary Examiner*—James Engel
*Attorney, Agent, or Firm*—Morgan & Finnegan

[57] ABSTRACT

A labeling machine applies an adhesive to labels for attachment to containers and has a glue bar which engages a glue roller. A label drum receives and delivers labels into engagement with containers for wrap around labeling of the containers. An adhesive is delivered to the glue bar. The adhesive is a hot melt adhesive which can maintain its label bond while withstanding high heat such as from a pasteurization process. The hot melt adhesive has a viscosity which tends to increase if the adhesive is not kept in constant motion or is allowed to set. The shear of the adhesive is increased during adhesive transfer to ensure low viscosity transfer of the adhesive from the glue roller to a label positioned on the label drum.

26 Claims, 6 Drawing Sheets

U.S. PATENT DOCUMENTS

| | | | |
|---|---|---|---|
| 4,574,020 | 3/1986 | Fosnaught . | |
| 4,604,154 | 8/1986 | Fosnaught . | |
| 4,608,418 | 8/1986 | Czerwinski et al. . | |
| 4,629,528 | 12/1986 | Tanaka et al. . | |
| 4,632,721 | 12/1986 | Hoffmann et al. . | |
| 4,662,925 | 5/1987 | Thimons et al. . | |
| 4,671,836 | 6/1987 | Fumei . | |
| 4,686,931 | 8/1987 | Difrank . | |
| 4,693,210 | 9/1987 | Difrank . | |
| 4,694,633 | 9/1987 | Fujio et al. . | |
| 4,704,173 | 11/1987 | Hoffman . | |
| 4,724,037 | 2/1988 | Olsen . | |
| 4,726,872 | 2/1988 | Olsen . | |
| 4,729,811 | 3/1988 | Difrank . | |
| 4,735,668 | 4/1988 | Hoffmann . | |
| 4,761,200 | 8/1988 | Szeremeta . | |
| 4,772,354 | 9/1988 | Olsen et al. . | |
| 4,781,785 | 11/1988 | Szeremeta . | |
| 4,832,774 | 5/1989 | Difrank et al. . | |
| 4,844,760 | 7/1989 | Dickey . | |
| 4,844,957 | 7/1989 | Hoffman . | |
| 4,870,142 | 9/1989 | Czerwinski et al. . | |
| 4,923,557 | 5/1990 | Dickey . | |
| 4,931,122 | 6/1990 | Mitchell . | |
| 4,977,002 | 12/1990 | Hoffman . | |
| 4,984,413 | 1/1991 | Cosmo . | |
| 5,037,499 | 8/1991 | Bright et al. . | |
| 5,045,140 | 9/1991 | Dickey . | |
| 5,078,826 | 1/1992 | Rogall . | |
| 5,091,040 | 2/1992 | Otruba . | |
| 5,091,239 | 2/1992 | Przeworski et al. . | |
| 5,116,452 | 5/1992 | Eder . | |
| 5,160,570 | 11/1992 | Dickey | 118/259 X |

LABELLING MACHINE AND METHOD FOR APPLYING ADHESIVE TO LABELS FOR ATTACHMENT TO CONTAINERS AND ARTICLE THEREFORE

FIELD OF THE INVENTION

This invention relates to a labeling machine and method for applying an adhesive to labels for attachment to containers, and more particularly, to a labeling machine and method for applying an adhesive to labels wherein the adhesive maintains a label bond while withstanding high heat such as from a pasteurization process, and wherein during adhesive transfer the adhesive has a viscosity which tends to increase if the adhesive is not kept in constant motion or is allowed to set.

BACKGROUND OF THE INVENTION

The increased concern for health standards in consumer product packaging requires that containers often be pasteurized before they are filled. This makes the application of labels to some containers especially difficult because the labels typically are applied by wrap around labeling to a container before the container is filled. After the label is applied, the empty container is pasteurized. The high heat of pasteurization could cause a hot melt adhesive to weaken and cause heat distortion of the label with the result that the adhesive bond would break. This problem could occur with hot beverage filling, where the containers are filled under heat with a beverage.

One type of hot melt adhesive, comprising a polyurethane based polymer, has been found advantageous for use on an adhesive based joint for a label applied by wrap around labeling and which is subject to high heat such as a pasteurization process. An example of such adhesives are those adhesives disclosed in U.S. Pat. Nos. 4,608,418 and 4,870,142 to Czerwinski et al., dated Aug. 26, 1986 and Sep. 26, 1989 respectively. The adhesives disclosed in these patents are advantageous because they can withstand high heat such as from a pasteurization process or hot beverage filling, while maintaining the label bond even when the label is subject to heat induced forces. Thus, the heat induced forces will not tear the adhesive bond.

Such adhesives, however, are extremely tacky, and the label is prone to adhere to a glue roller when a glue roller engages the label for adhesive transfer. The label could be pulled from the label drum. Additionally, such hot melt adhesives have a viscosity which tends to increase if the adhesive is not kept in constant motion or is allowed to set. Thus, slight delays of a few seconds in which the adhesive is not agitated or sheared during transfer from glue bars onto glue rollers, or other contact points, could cause an increase in adhesive viscosity which would make adhesive transfer difficult or impossible.

SUMMARY OF THE INVENTION

It is therefore an object of the present invention to apply an adhesive to labels for attachment to containers wherein the adhesive is a hot melt adhesive having a viscosity which tends to increase if the adhesive is not kept in constant motion or is allowed to set.

It is another object of the present invention to apply an adhesive to labels wherein the adhesive has an extreme tacky quality to it.

It is another object of the present invention to provide an article which has a label applied thereto and an adhesive bond formed from an adhesive which can withstand high heat such as from a pasteurization process and which is applied by wrap around labeling.

In accordance with the present invention, a labeling machine applies an adhesive to labels for attachment to containers. A labeling machine includes a glue bar having a substantially arcuate configured roll engaging surface and at least one glue receiving recess formed on the arcuate roll engaging surface. The glue bar has a channel extending therethrough for receiving an adhesive and delivering adhesive to a glue receiving recess. A glue roller is engaged with the arcuate surface for receiving adhesive stored within the recess.

A label drum receives and delivers labels into engagement with containers for wrap around labeling of the containers. The label drum includes a surface which engages at least the leading edge of a label with the glue roller for transferring adhesive onto the leading edge.

Adhesive is delivered to the glue bar. The adhesive is a hot melt adhesive which can maintain its label bond while withstanding high heat such as from a pasteurization process or hot beverage filling. The hot melt adhesive has a viscosity which intends to increase if the adhesive is not kept in constant motion or is allowed to set. In accordance with one aspect of the present invention, the shear of the adhesive is increased at the point of contact the glue bar and the glue roller to ensure low viscosity transfer of the adhesive from the glue roller to a label position on the label drum.

In one aspect of the invention, the shear is increased by means of a longitudinal channel extending substantially along the length of the arcuate surface which engages the glue roller for receiving adhesive from the recess. The channel defines an edge forming a doctor blade surface for engaging the glue roller and removing excess adhesive from the roller. The hot melt adhesive comprises a polyurethane based adhesive.

In still another aspect of the present invention, the labeling machine includes a rotatable drum member having orifices on the drum surface in an area on which the label is held. A vacuum is drawn within orifices within the area adjacent to the trailing edge of the label to retain the label on the drum until it moves into a position for wrap around labeling. A vacuum is drawn within orifices adjacent to the leading edge of the label for retaining the leading edge of the label on the drum surface as a label moves into position for adhesive application. A greater vacuum is then generated within these orifices which is sufficient to retain the label on the drum surface and overcome the tendency for the label to pull away from the drum surface and adhere to the adhesive on the glue roller and thus roll with the glue roller.

In still another aspect of the present invention, the surface of the label drum on which the labels are positioned are resilient and formable. The glue roller engages therewith and the glue roller is substantially smaller in diameter than the diameter of the label drum to lessen the amount of heat transferred to a label. The effective smaller diameter of the glue roller actually decreases the amount of contact from the glue roller to the resilient drum surface thus reducing the heat transfer from the typically metallic glue roller to the label.

In still another aspect of the present invention, a plurality of conductive wires extend transversely across the glue roller to aid in melting the adhesive and enhance transfer of the adhesive onto the label. Circumferentially extending, peripheral grooves are positioned within the glue roller for receiving the conductive wires. In still another aspect of the present invention, air is blown outward from the orifices at the leading edge of the label when the leading edge has moved adjacent the container so as to move the leading edge into engagement with the container.

In still another aspect of the present invention, the label drum includes a rotatable drum member having orifices on the surface in the area in which a label is held. The rotatable drum member includes a port flange surface having a first set of inner port openings communicating with the respective surface orifices which underlie the area adjacent a trailing edge of a label. A set of outer port openings communicate to surface orifices which underlie an area adjacent a leading edge of a label.

A fixed vacuum flange has a circumferentially extending trailing edge flange manifold aligned with the inner port openings. A vacuum is drawn within the trailing edge flange manifold for drawing a vacuum on the area adjacent the trailing edge of the label to retain the label on the drum until it moves into a position for wrap around labeling.

A first leading edge flange manifold is aligned with the outer port opening. A vacuum is drawn within the first leading edge flange port for retaining the leading edge to the drum surface as a label moves into a position for adhesive application. A second circumferentially extending leading edge flange manifold is aligned after the first leading edge port and aligned with the outer port. That second leading edge port extends circumferentially in the vacuum flange so that it is aligned at a point during drum rotation when the glue roller transfers adhesive onto the leading edge of the label. A typically greater amount of vacuum is generated within the second leading edge vacuum manifold which is sufficient to retain the label on the drum surface and overcome the tendency for the label to adhere to the adhesive on the glue roller and roll therewith.

In still another aspect of the present invention, an intermediate glue roller is positioned adjacent to the glue roller. The intermediate glue roller includes resilient pads thereon which engage the glue roller as the rollers rotate for transferring adhesive from the glue roller onto the resilient pads. Hot air is blown outward from a pad when a pad engages a label positioned on the label drum during adhesive transfer to prevent the label from sticking to the pad and being removed from the label drum. The hot air also maintains lower adhesive viscosity.

In still another aspect of the present invention, an article has a cylindrical body member, a main portion with straight sides and at least one inwardly directed portion. A label is wrapped around the body member and has overlapping ends forming a seam. The seam includes a polyurethane based thermoplastic adhesive which maintains the label bond while withstanding high heat such as from a pasteurization process or thermo-beverage filling. The adhesive has a viscosity before application which tends to increase if the adhesive is not kept in constant motion was allowed to set.

DESCRIPTION OF THE DRAWINGS

The foregoing and other objects and advantages of the present invention will be appreciated more fully from the following description, with references to the accompanying drawings in which.

DETAILED DESCRIPTION OF THE INVENTION

Figure 1:
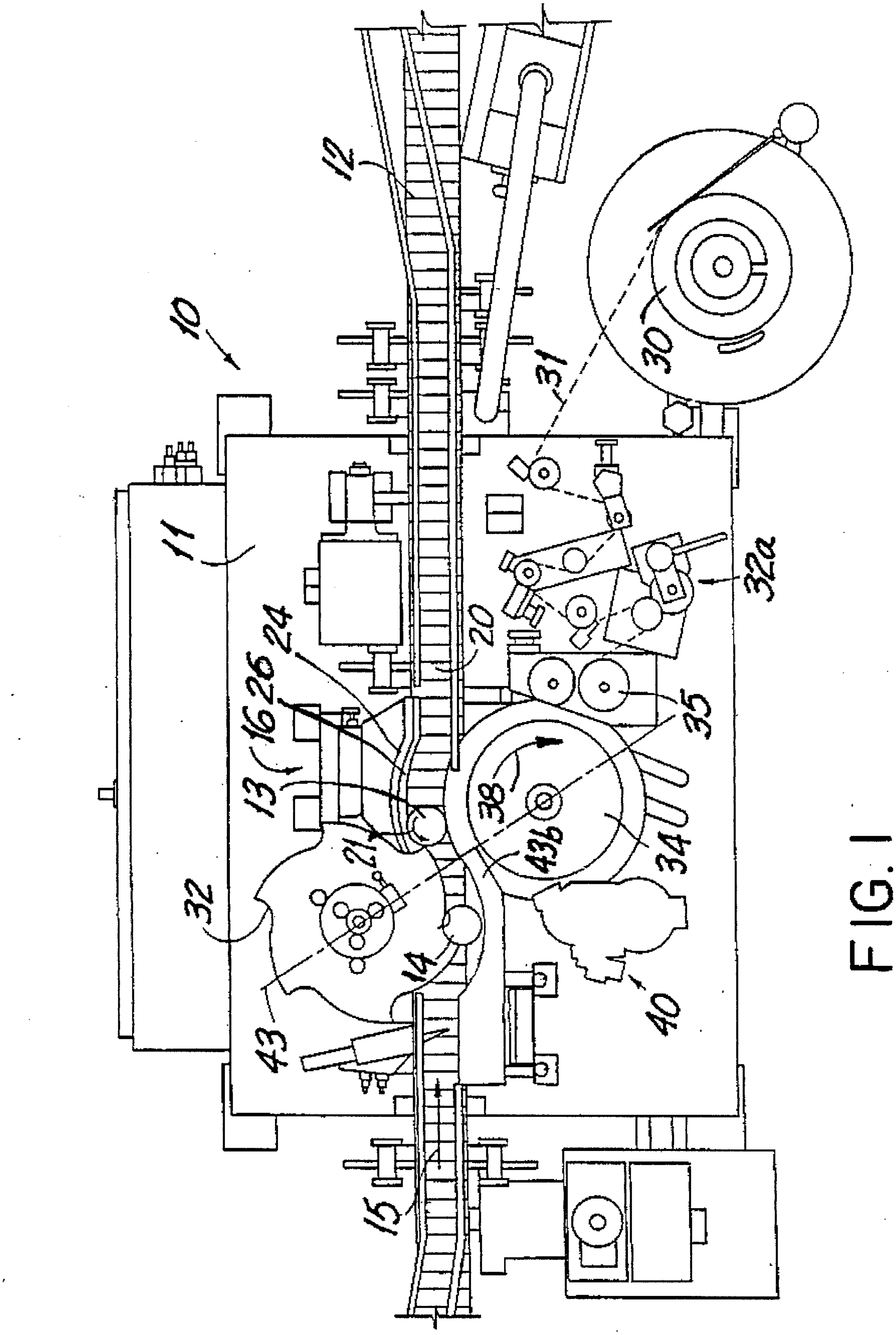
FIG. 1 is a plan view of a labeling machine that characterizes features of the present invention.

FIG. 1 illustrates a general schematic side elevation view of a labeling machine 10 that is mounted on a mounting surface or generally flat table top 11. A link belt conveyor 12 moves containers or product packages 13, 14 toward the labeling machine 10 in the direction of arrow 15. The labeling machine 10 is designed to apply labels to containers that have a broad range of sizes, or diameters for cylindrical containers. Among this spectrum of container sizes that the labeling machine 10 can process is a mid size container that is intermediate between the maximum and minimum container sizes that machine 10 will label.

Containers on the conveyor 12 are first received in the labeling machine 10 by a star wheel assembly 32. The star wheel assembly 32, moves containers 13, 14 in the direction of the arrow 15 toward a roll-on-pad assembly 16. In cycling the containers 13, 14 through the labeling process, the star wheel assembly 32 brings the containers past the roll-on-pad assembly 16, which imparts a counter-clockwise rotation to these containers in the direction of arrow 21. The roll-on-pad assembly 16 generally has an arcuate guide 24 that is covered with a resilient padding 26. The padding grips the containers and forces them to rotate in the desired direction.

As shown in FIG. 1, a row of labels 30 provides a web 31 of labels that is drawn through a feed roller system *32a* to a cutter 33, which could be a cutter drum (not shown in detail). In accordance with another characteristic of the invention, the cutter is placed close to a cylindrical label drum 34 that has a perforated surface containing orifices through which vacuum and pressure are drawn and expelled to retain a label thereto and later blow the leading edge into engagement with an orifice. The web is drawn through a feed roller system and is pressed against the cutter having a vacuum drawn within. The cutter rotates and the cutter blade (not shown) protruding from the cylindrical surface of the cutter drum presses against the web.

Figure 3:
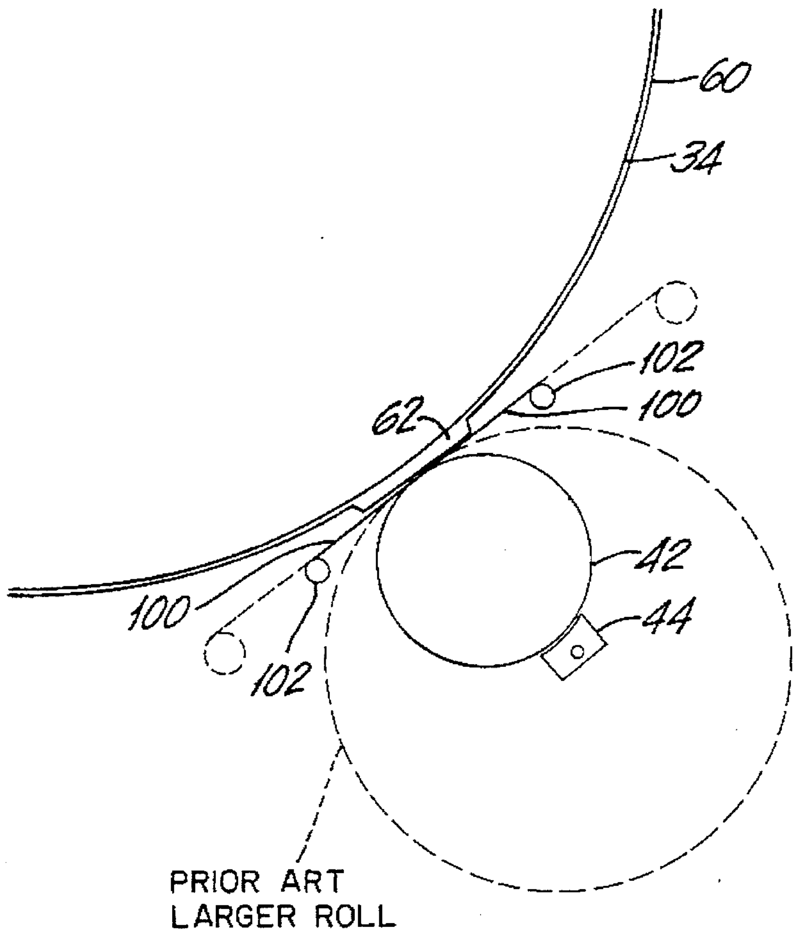
FIG. 3 is a general schematic view of the glue roller, glue bar and label drum and showing relative dimensions of the glue roller and the present invention compared with a prior art glue roller.
Figure 4:
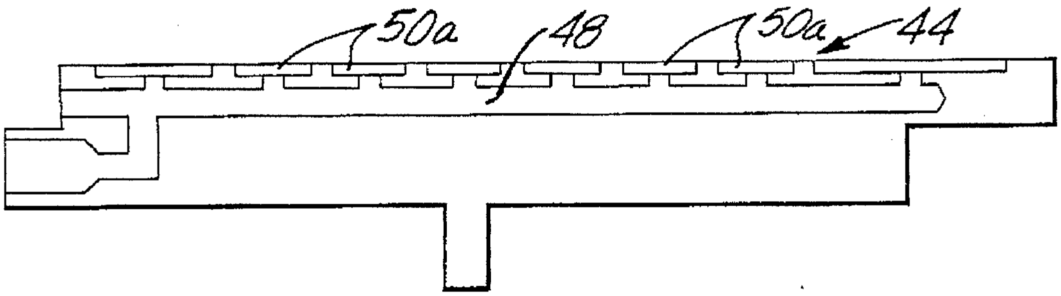
FIG. 4 is a plan view of the glue bar in accordance with the present invention.
Figure 5:
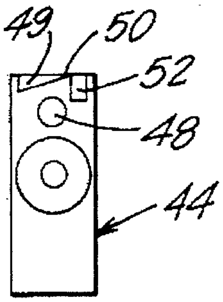
FIG. 5 is a sectional view of the glue bar of the present invention.
Figure 6:
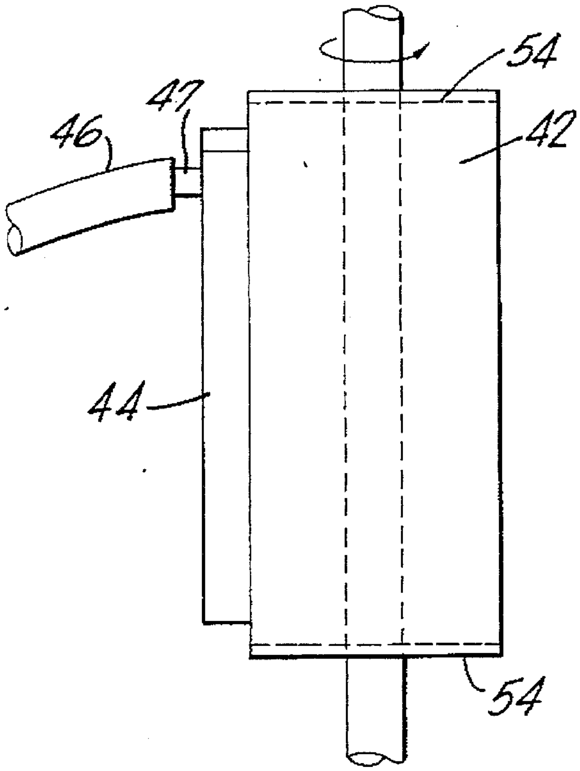
FIG. 6 is a schematic plan view showing the relationship of the glue bar and glue roller.
Figure 7:
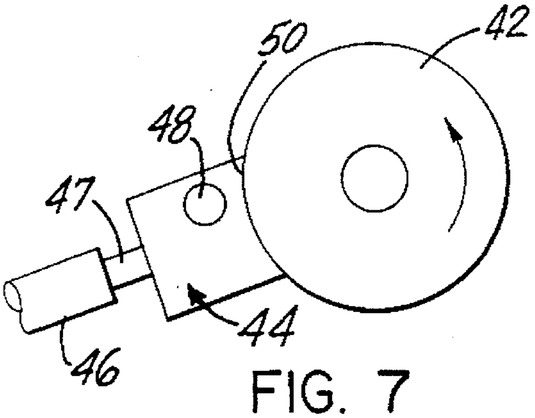
FIG. 7 is a schematic elevation view of the glue bar and glue roller.

Severed labels (not shown in FIG. 1) are rotated in the direction of arrow 38 on the label drum 34 to an adhesive applicator 40, which includes a glue roller 42 (FIG. 3). Adhesive is applied to the surface of the label that is exposed on the label drum by the glue roller 42. The label drum 34 rotates the leading edge of the label to where the leading edge of the label is approximately in alignment with a line 43 between the rotational axis of the vacuum and the star wheel assembly. As illustrated, the line 43 also coincides with the termination of an arcuate feed guide 43*b*.

The container and cusp 43*a* of the star wheel assembly is pushed by the star wheel until it is engaged with the leading edge of the label and the label wraps itself around the container. The container continues its counter-clockwise rotation as indicated by the arrow 21.

Referring now to FIGS. 4 through 7, there is shown the adhesive applicator of the present invention in the form of a glue bar indicated at 44 and glue roller 42. Labeling adhesive is pumped under pressure from a source (not shown) which agitates the adhesive, through a hose 46 that flows through a nipple 47 to the glue bar 44. The glue bar 44 is preferably formed of brass. The glue bar 44 includes a lengthwise bore 48 contained within (FIG. 4) which receives adhesive and applies it to a recess 49, which applies a film of glue to a narrow surface of the cylindrical glue roller positioned adjacent the glue bar. As illustrated, the glue bar 44 includes a substantially arcuate configured roll engaging surface 50 which engages the glue roller. The glue bar surface can include adhesive collection cutouts (50*a*), which connect to the adhesive receiving bore 48.

In accordance with the present invention, the adhesive used is a hot melt adhesive which maintains its label bond while withstanding high heat such as from a pasteurization process or from the hot filling of beverages into orifices. The hot melt adhesive has a viscosity which intends to increase if the adhesive is not kept in constant motion or is allowed to set, especially at common label application temperatures known to those skilled in the art. Examples of such adhesive are the urethane polymer adhesives disclosed in the U.S. Pat. Nos. 4,608,418 and 4,870,142 issued respectively Aug. 26, 1986 and Sep. 26, 1989 to Czerwinski et al. These adhesives are advantageous because they form a strong bond which withstand the heat of pasteurization or other similar processes so that if the film forces increase which cause it to shrink during the heating process, the adhesive will not weaken with resultant tearing of the label. This is advantageous in certain industries such as the beverage industry where containers may be pasteurized after labels are applied.

In accordance with the present invention, the shear of the adhesive at the point of adhesive transfer, and more particularly at the point of contact of the glue bar 44 and the glue roller 42 is increased to ensure low viscosity transfer of the adhesive from the glue roller to the label positioned on the label drum. In the illustrated embodiment of the present invention, a longitudinal channel 52 extends substantially along the length of the arcuate surface 50 and engages the glue roller 42 for receiving adhesive from the recess. This longitudinal channel 52 effectively increases the shear thus reducing the viscosity of the adhesive. This channel 52 can define an edge thus aiding in forming a doctor blade surface for engaging the glue roller 42 and removing excess adhesive from the roller. Other possible means for increasing shear could include cutting elements (not shown) positioned on the glue bar 44 or other means which can be developed by those skilled in the art.

The transverse ends of the glue roller 42 can be closed by means of low thermal conductivity isolation rings 54 formed of suitable materials. Further in this regard, the length of the glue roller 42 can be significantly greater than the corresponding dimension of the glue bar. In this way, the ends of the glue roller can extend beyond both ends of the wetted surface of the roller that is established by the glue bar 44.

The glue roller 42 is typically formed of metallic material. The label drum 34 typically also includes a resilient padded material 60 positioned thereon on which the label is retained, and a protruding portion 62 on which the leading edge of the label is retained. (FIG. 3). It is typical that the temperature of the adhesive is maintained within an acceptable range to maintain proper adhesive viscosity. Although not illustrated in detail, a heater cartridge can be received in a lengthwise well formed in the glue bar. The heater cartridge transfers its heat directly to the metal body of the glue bar and through the wetting action of the adhesive transfers that heat to the glue roller. A temperature sensor such as a thermocouple can be secured to the outer surface of the adhesive bar in order to register the temperature of the glue bar and the glue within in order to keep the adhesive temperature within a prescribed temperature range.

As the glue roller 42 engages the resilient surface 60, the surface of contact is deformed so that a larger area of the glue roller engages the label. The heat from the glue roller is thus transferred to the label and in some cases, the label is deformed. Therefore, it has been found that a smaller diameter glue roller is advantageous to minimize the amount of heat conducted from the glue roller to the label. It has been learned that a cylindrical glue roller which has a circumference that is substantially smaller (by a factor of at least 2 to 1) than the label drum circumference is advantageous.

Because of the increased tackiness of the adhesive used in the present invention, often during transfer of adhesive from the glue roller to the label, the label tended to stick to the adhesive, causing the label to peel from the label drum surface and be retained onto the glue roller. It is therefore, advantageous to ensure that the label is maintained on the label drum during adhesive transfer. In this regard, the present invention now provides for additional vacuum draw on the label drum and especially onto the leading edge of the label at the adhesive transfer point.

Figure 8:
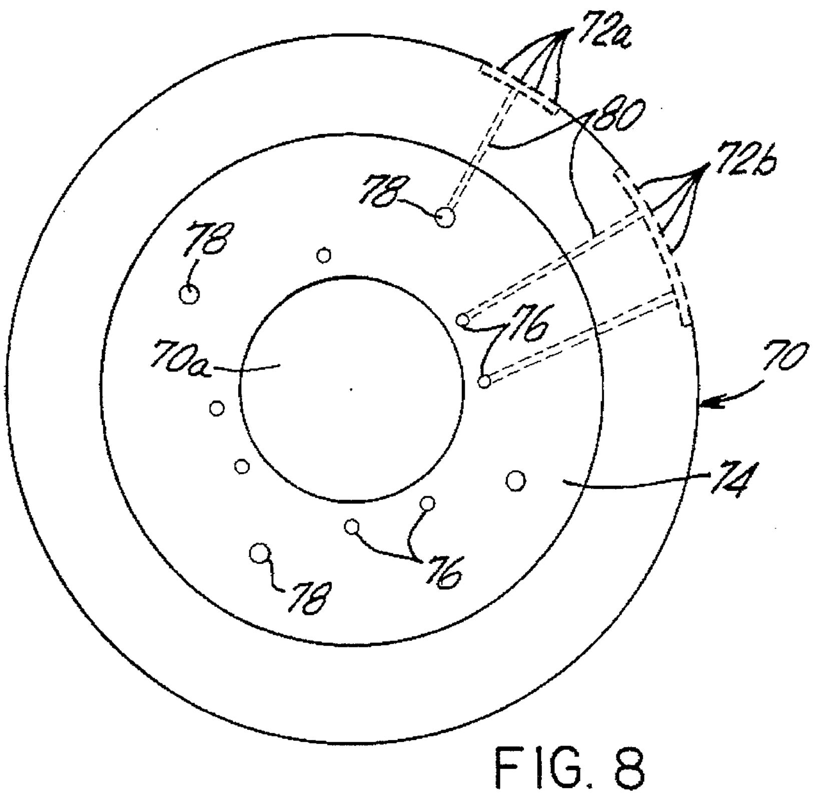
FIG. 8 is a schematic side elevation view of the label drum showing the various inner and outer ports.
Figure 9:
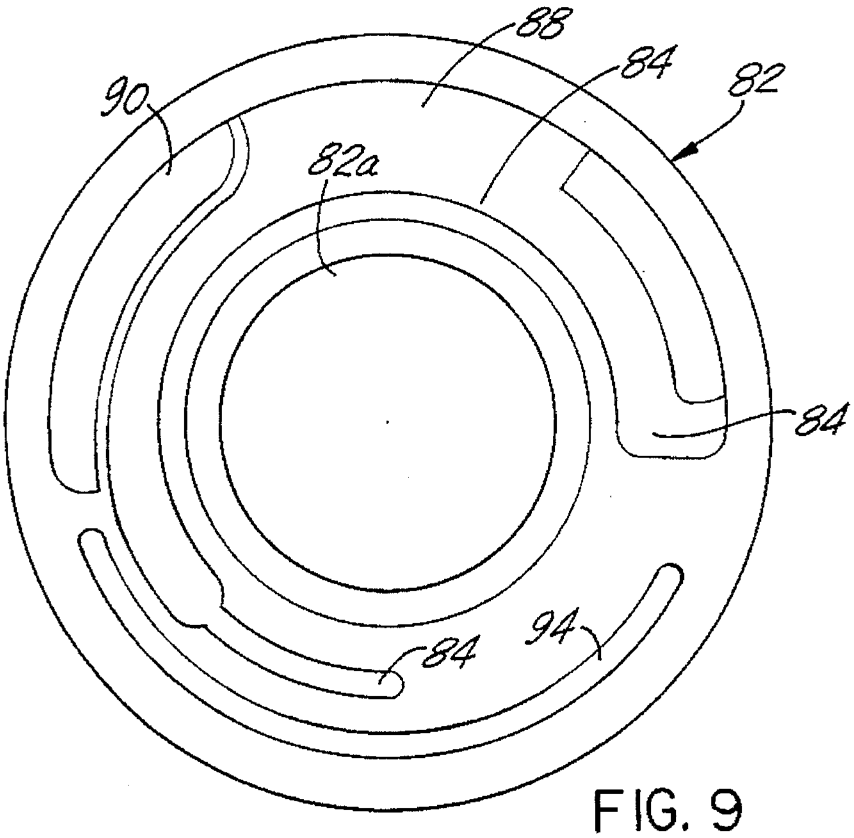
FIG. 9 is a schematic side sectional view of the vacuum flange showing the circumferentially extending trailing and leading edge vacuum flange manifolds.
Figure 10:
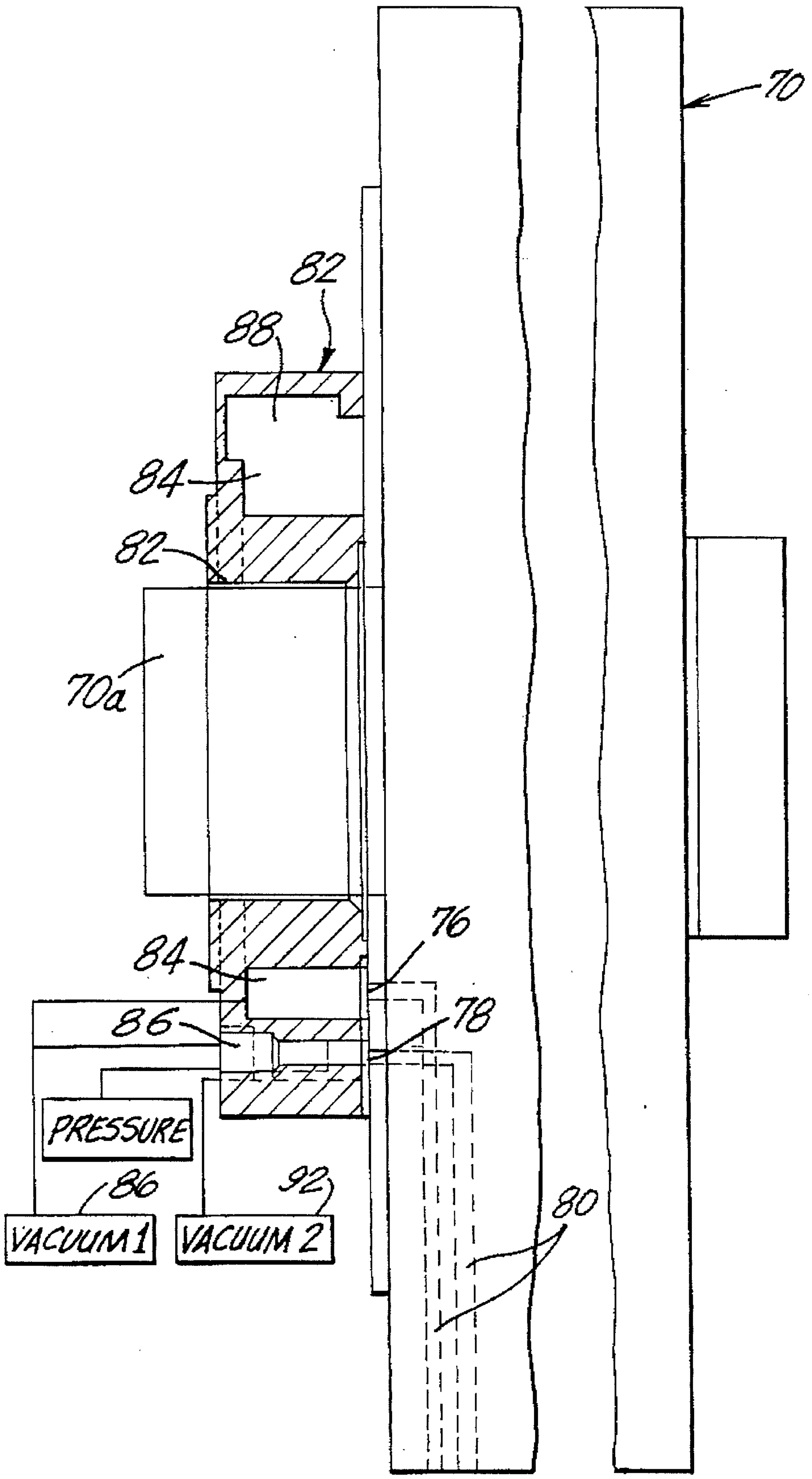
FIG. 10 is a generally schematic sectional view of the label drum and vacuum flange operatively connected together.

As shown in FIGS. 8, 9 and 10, the label drum 34 includes a rotatable drum member, indicated at 70, having orifices on the surface. The orifices are positioned in an area on which a label is held. The drum member 70 can be rotatably mounted to the machine frame (not shown). The rotatable drum member includes a side flange surface 74 having an inner set of port openings 76 communicating with orifices 72*a* adjacent the area of the trailing edge of a label. An outer set of port openings 78 communicates with the surface orifices 72*b* adjacent an area of the leading edge of a label. The port openings 76, 78 can communicate via air channels and manifolds 80 (shown in dotted lines) to the respective orifices 72*a*, 72*b*.

A fixed vacuum drum flange indicated generally at 82, (shown in larger relative dimension than member 70 of FIG. 8) has a circumferentially trailing edge flange manifold 84 aligned with the inner port openings 76. FIG. 10 shows the drum 70 interconnected to the fixed flange 82 by means of a drum shaft 70*a* extending through the bore opening 82*a* of the flange. A first source of vacuum 86 (FIG. 10) is connected to the trailing edge flange manifold 84 and draws a vacuum within the manifold 84 and draws a vacuum on the area adjacent the trailing edge of the label to retain the label on the drum as the drum rotates about its axis and against the fixed vacuum drum flange. As shown in FIG. 9, the trailing edge flange manifold 84 extends circumferentially to a point so that vacuum draw is maintained on the trailing edge until the label moves into a position for wrap around labeling.

A first leading edge flange manifold 88, which can also be an integral part of a larger manifold, which includes the manifold 84, is aligned with the outer port openings 78. The first source of vacuum 86 draws a vacuum within the first leading flange manifold 88 for retaining the leading edge to the drum surface as the labels move into a position for adhesive application. A second leading edge flange manifold 90 is aligned with the outer port openings and extends after the first leading edge manifold to a point where adhesive transfer occurs.

A second source of vacuum 92 generates a vacuum within the second leading edge flange manifold 90 which is typically greater than that generated in the first leading edge flange manifold. This greater vacuum is in an amount sufficient to retain the label on the drum surface and overcome the tendency for the label to adhere to the adhesive and glue roller. Such greater vacuum could be generated by a Venturi based vacuum generation system. Thus, this separate second leading edge flange manifold 90 allows a second source of vacuum and greater vacuum to be generated onto the leading edge of the label and thus prevent label transfer onto the glue roller and maintain label retention on the label drum. A pressure manifold 94 extends circumferentially after the second manifold 90 and allows pressure generated from a pressure source 96 to be exerted against the label.

Figure 2:
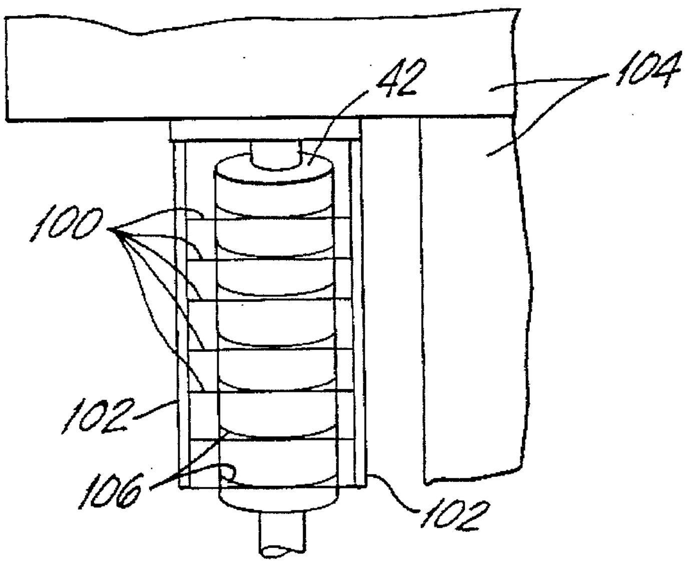
FIG. 2 is a schematic environmental view of a glue roller showing the conductive wires positioned adjacent thereto in accordance with the present invention.

As shown in FIG. 2, a plurality of conductive wires 100 extend transversely across the glue roller 42 to aid in melting the adhesive and allow enhanced transfer of the adhesive onto the label. The conductive wires 100 are supported by vertical support posts 102 which are fixed to frame members 104 of the machine 10. Grooves 106 are positioned in the glue roller 42 for receiving the conductive wires. The wires conduct heat which can be generated by a source of current (not shown). As the adhesive contacts the conductive wires, the adhesive melts further and causes a sliding action of the adhesive against the glue roller, thus acting somewhat as a lubricant. FIG. 3 shows a schematic of how the smaller diameter roll allows close spacing of the members 102.

Figure 11:
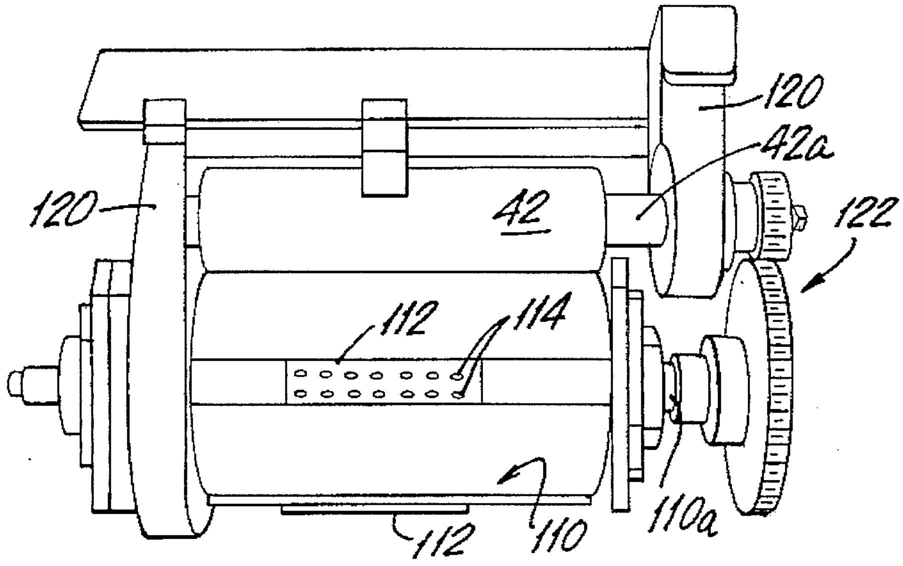
FIG. 11 is a general environmental view of one aspect of the glue roller and intermediate glue roller of one embodiment of the present invention.
Figure 12:
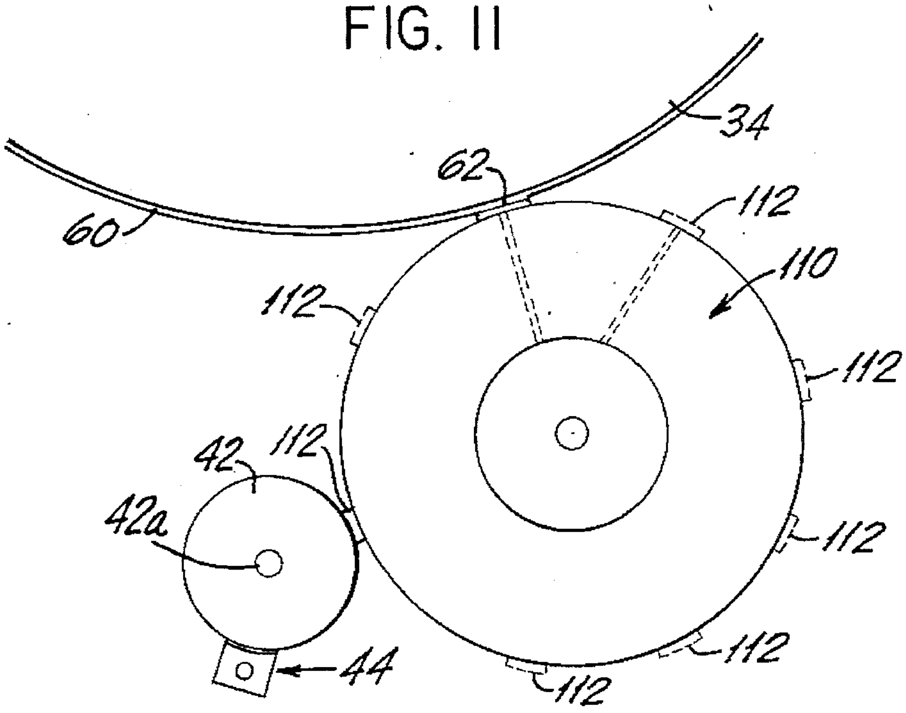
FIG. 12 is a general schematic view of the glue bar, glue roller, intermediate glue roller and label drum and showing relative positions of each.

Referring now to FIGS. 11 and 12, a second embodiment of the invention is disclosed which does not include direct engagement of the glue roller 42 with the label drum. Instead, an intermediate rotatable roller, indicated at 110, with resilient pads 112 thereon, receives adhesive from the glue roller 42 onto the pads 112 and transfers the adhesive positioned on the resilient pads 112 to respective label areas.

In accordance with this embodiment of the invention, hot air can be generated through the resilient pads 112 by pressure orifices 114 against the label to help force the label against the label drum surface to ensure that the label is not peeled from the label drum surface and onto the intermediate glue roller 110 by the tacky glue contained on the resilient pads. Such force of hot air can be generated by a conventional hot air blower (not shown) which blows air through a manifold and baffle arrangement 116 contained within the intermediate roller. As illustrated in FIG. 11, the glue roller 42 and intermediate roller 110 can be mounted on frame members 120 and interconnected by a gear assembly 122 which is run off of a main drive (not shown). Gear assembly 122 is connected to respective central drive shafts 110*a*, 42*a* of the rollers 110, 42.

In operation, adhesive is delivered to the glue bar. The adhesive is a hot melt adhesive which can maintain a label bond while withstanding high heat such as from a pasteurization processes. This adhesive has a viscosity that tends to increase if the adhesive is not kept in substantially constant motion or is allowed to set. Adhesive is transferred from the glue bar 44 to a glue roller 42 while increasing the shear of the adhesive at the point of contact of the glue bar 44 and the glue roller 42 to ensure low viscosity transfer of the adhesive from the glue roller to the label positioned on the label drum. In the illustrated embodiment, the shear is increased by engaging the glue roller with the adhesive contained within the longitudinal channel of the glue bar. The glue roller 42 then engages a portion of a label retained on the label drum to transfer adhesive onto the label. The label is then moved into engagement with a container conveyed along the conveyor for wrap around labeling.

In the second embodiment of the invention shown in FIGS. 11 and 12, the glue roller 42 transfers adhesive to the resilient pads 112 on the intermediate roller 110 which then transfers adhesive to the respective areas of the label on which adhesive is to be applied. The hot burst of air through the resilient pad maintains the label against the label drum to prevent inadvertent lifting of the label by the adhesive positioned on the resilient pads 112.

Figure 13:
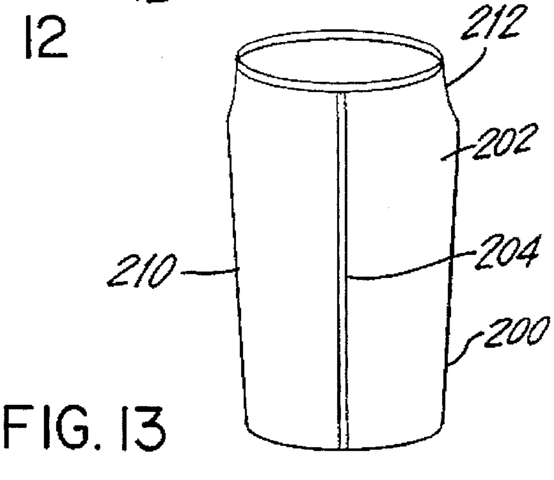
FIG. 13 is a general environmental view of a container that has been wrapped with a label in accordance with the present invention.

FIG. 13 illustrates on article 200 having a label 202 using the adhesive described above for securing the label along a joint 204. The article 200 is formed as a cylindrical body member having a main portion 210 with straight sides. The article could include an inwardly directed portion 212 where label is heat shrunk thereabout.

It is to be understood that the above description is only various preferred embodiments of the invention. Numerous other arrangements may be devised by one skilled in the art without departing from the spirit and skill of the invention.

That which is claimed is:

1. A labeling machine for applying an adhesive to labels for attachment to containers comprising a glue bar having a substantially arcuate configured roll engaging surface, at least one glue receiving recess formed on the arcuate roll engaging surface, said glue bar having means extending therethrough for receiving an adhesive and delivering adhesive to the glue receiving recess, a glue roller engaged with the arcuate surface for receiving adhesive stored within the recess, a label drum for receiving and delivering labels into engagement with containers for wrap around labeling of the containers, said label drum including means for engaging at least the leading edge of a label with the glue roller for transferring adhesive onto the leading edge, means for delivering an adhesive to the glue bar, wherein said adhesive is a non-reactive, thermoplastic hot melt polyurethane adhesive which can maintain its label bond while withstanding high heat such as from a pasteurization process, said hot melt adhesive having an initial high viscosity which tends to increase if the adhesive is not kept in constant motion or is allowed to set, and means positioned in the glue bar for increasing the shear of the high viscosity, polyurethane adhesive at the point of contact of the glue bar and the glue roller to ensure low viscosity transfer of said adhesive from the glue roller, and a plurality of conductive wires extending transversely across the glue roller to aid in melting the adhesive so as to enhance adhesive transfer and to a label positioned on the label drum.

2. The labeling machine according to claim 1 wherein said means for increasing the shear comprises a longitudinal channel extending substantially along the length of the arcuate surface which engages said glue roller for receiving adhesive from said recess.

3. The labeling machine according to claim 2 wherein said channel defines an edge forming a doctor blade surface for engaging said glue roller and removing excess glue from said roller.

4. The labeling machine according to claim 1 wherein said hot melt adhesive comprises a polyurethane based adhesive.

5. A labeling machine for applying an adhesive to labels having leading and trailing edges for attachment to containers comprising a glue roller, means for delivering an adhesive to the glue roller, wherein said adhesive is a hot melt adhesive which can maintain its label bond while withstanding high heat such as from a pasteurization process, said hot melt adhesive having a viscosity which tends to increase if the adhesive is not kept in constant motion or is allowed to set, a label drum positioned adjacent the glue roller for receiving and delivering labels into engagement with the glue roller for transferring adhesive at least onto the leading edge of the label and for further movement of labels into engagement with containers for subsequent wrap around labeling of a container, said label drum having orifices on the surface and positioned in an area on which a label is held, means for drawing a vacuum within orifices on the area adjacent the trailing edge of the label to retain said label on said drum until it moves into a position for wrap around labeling, means for drawing a vacuum within orifices adjacent the leading edge of the label for retaining the leading edge to the drum surface as the label moves into a position for adhesive application, and means for generating a greater vacuum within orifices adjacent the leading edge of the label while maintaining vacuum on the trailing edge during adhesive transfer on the label which is sufficient to retain the label on the drum surface and overcome the tendency for the label to adhere to the adhesive on the glue roller and lift off the label drum.

6. A labeling machine according to claim 5 wherein the surface of said label drum on which labels are positioned is resilient and deformable when said glue roller engages therewith, and wherein said glue roller is substantially smaller in diameter than said label drum to lessen the amount of heat transfer to a label.

7. A labeling machine according to claim 5 including a plurality of conductive wires extending transversely across said glue roller to aid in melting said adhesive and enhance transfer of said adhesive onto said label.

8. A labeling machine according to claim 7 including grooves positioned within said glue roller for receiving said conductive wires.

9. A labeling machine according to claim 5 including means for blowing air from the orifices underlying the leading edge of the label when the leading edge has moved adjacent the container so as to move the leading edge against the container.

10. A labeling machine for applying an adhesive to labels for attachment to containers comprising a glue roller, means for delivering an adhesive to the glue roller, said adhesive being a hot melt adhesive which can maintain its label bond while withstanding high heat such as from a pasteurization process, said hot melt adhesive having a viscosity which tends to increase if the adhesive is not kept in constant motion or is allowed to set, a label drum positioned adjacent the glue roller for receiving and delivering labels into engagement with the glue roller for transferring adhesive at least onto the leading edge of the label and for further movement of labels into engagement with containers for subsequent wrap around labeling of a container, said label drum including a rotatable drum member having orifices on the surface and positioned in an area on which a label is held, said rotatable drum member including a port flange rotatable with said drum member and having a first set of inner port openings communicating with the surface orifices which underlie the area adjacent a trailing edge of a label, and an outer set of port openings communicating with surface orifices which underlie an area adjacent a leading edge of a label, a fixed vacuum drum flange having a circumferentially extending trailing edge flange manifold aligned with said inner port openings, and means for drawing a vacuum within said trailing edge flange manifold for drawing a vacuum on the area adjacent the trailing edge of the label to retain said label on said drum until it moves into a position for wrap around labeling, and a first leading edge flange manifold aligned with said outer manifold opening, means for drawing a vacuum within said first leading edge flange manifold for retaining said leading edge to the drum surface as said label moves into a position for adhesive application, and a second leading edge flange manifold aligned with said outer port and positioned at a point during drum rotation when said glue roller transfers adhesive onto the leading edge of said label, and including means for generating a vacuum within said second leading edge flange manifold which is sufficient to retain the label on the drum surface and overcome the tendency for the label to adhere to the adhesive on the glue roller and roll therewith.

11. A labeling machine according to claim 10 wherein the surface of said label drum on which labels are positioned is resilient and deformable when said glue roll engages therewith, and wherein said glue roller is substantially smaller in diameter than said label drum to lessen the amount of heat transfer from the glue roller to a label.

12. A labeling machine according to claim 10 including a plurality of conductive wires extending transversely across said glue roller to aid in melting said adhesive and allow enhanced transfer of said adhesive onto said label.

13. A labeling machine according to claim 12 including grooves positioned within said glue roller for receiving said conductive wires.

14. A labeling machine for applying an adhesive to labels for attachment to containers comprising